United States Patent [19]

Smith

[11] Patent Number: 4,800,627
[45] Date of Patent: Jan. 31, 1989

[54] LOAD BINDER AND METHOD OF MAKING SAME

[75] Inventor: Lonnie M. Smith, St. Louis, Mo.

[73] Assignee: Durbin-Durco, Inc., St. Louis, Mo.

[21] Appl. No.: 38,933

[22] Filed: Apr. 16, 1987

[51] Int. Cl.⁴ .............................................. B66F 3/00
[52] U.S. Cl. .................. 24/68 CD; 24/270; 29/437
[58] Field of Search .............. 24/270, 68 CT, 68 CD, 24/68 R, 69 T; 29/437, 439, 440, 515

[56] References Cited

U.S. PATENT DOCUMENTS

| | | | |
|---|---|---|---|
| 1,758,831 | 5/1930 | Haubert | 24/270 |
| 1,885,128 | 11/1932 | Montgomery | 24/270 |
| 2,422,001 | 6/1947 | Durbin | 24/270 |
| 2,500,488 | 3/1950 | Durbin et al. | 24/270 |
| 2,512,491 | 6/1950 | Durbin | 24/270 |
| 3,395,436 | 8/1968 | Sullivan | 29/439 |
| 3,395,892 | 8/1968 | Ratcliff | 24/270 |
| 3,726,507 | 4/1973 | Rymsza | 24/270 |
| 3,826,469 | 7/1974 | Ratcliff et al. | 24/270 |
| 4,376,334 | 3/1983 | Miller | 29/437 |

*Primary Examiner*—Victor N. Sakran
*Attorney, Agent, or Firm*—Paul M. Denk

[57] ABSTRACT

A load binder includes a lever and a clevis each being connected to respective securing members for securing to a load or a tie member such as a chain or a rope. Each of the securing members includes a retaining member for retaining a swivel bolt. The swivel bolts are cast in one piece with a head and a shaft. The retaining members are also cast with an opening of suitable size and shape to receive the heads of their respective swivel bolts. While the retaining members are still at an elevated temperature from the casting process, the head of the swivel bolt is inserted through the respective openings and the retaining members are then deformed while at an elevated temperature to capture the respective heads of the swivel bolts.

3 Claims, 1 Drawing Sheet

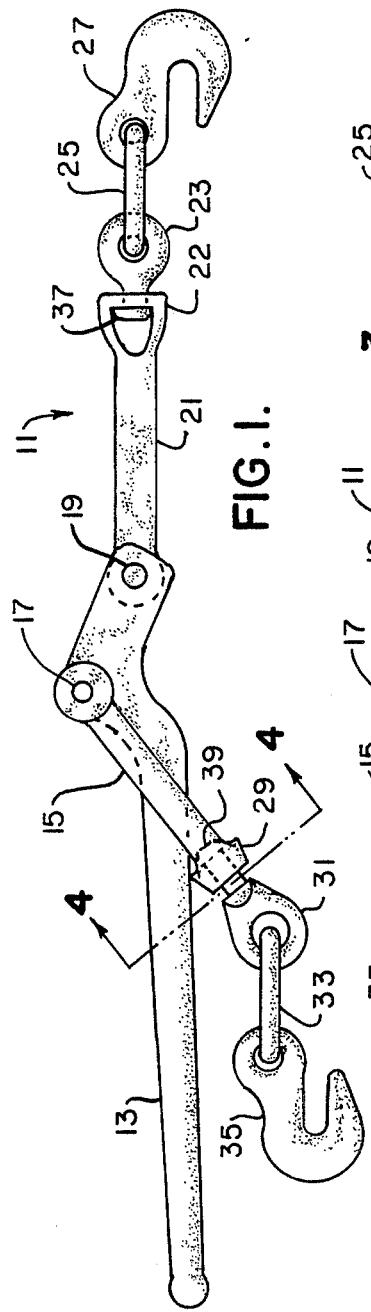
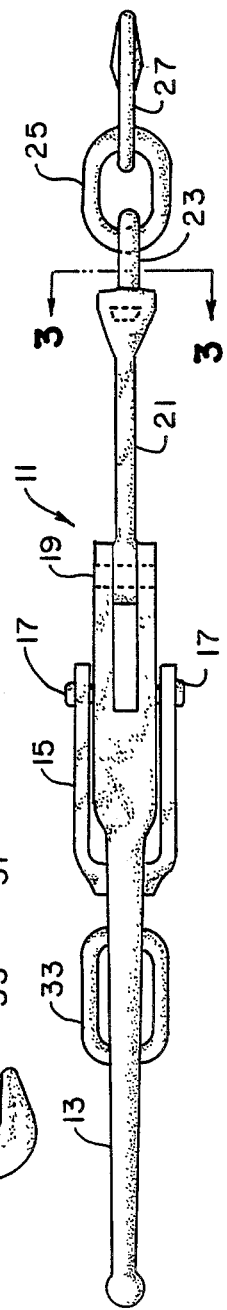
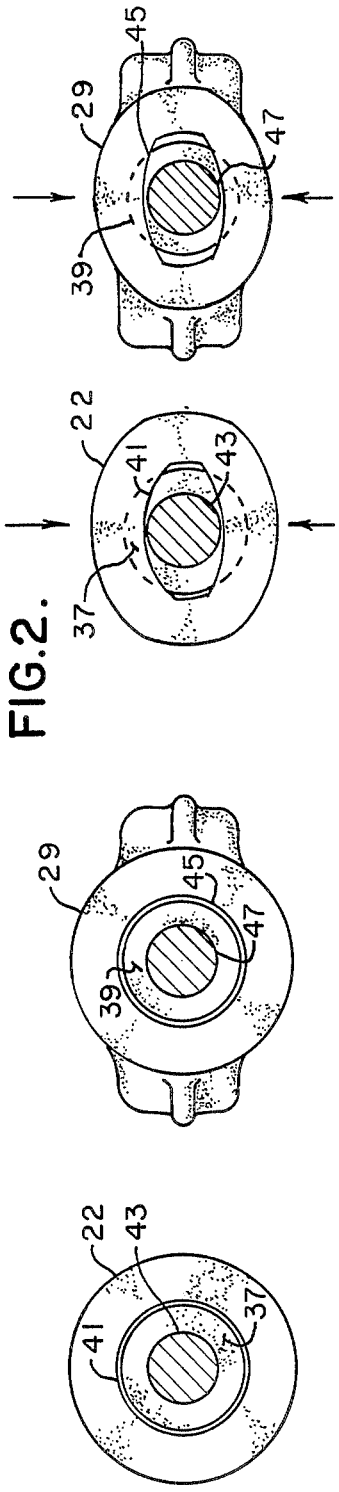
FIG. 1.
FIG. 2.
FIG. 3. BEFORE STAKING.
FIG. 4. BEFORE STAKING.
FIG. 5. AFTER STAKING.
FIG. 6. AFTER STAKING.

LOAD BINDER AND METHOD OF MAKING SAME

BACKGROUND OF THE INVENTION

This invention relates generally to load binders, and more particularly to load binders with increased reliability and improved manufacturability.

There are a number of print art patents that show load binders. For examples, the assignee of this present invention and application has previously obtained a number of patents related to the construction and application of load binders or load binding devices. Such patents include U.S. Pat. Nos. 3,418,008, 2,512,491, 2,500,488, and 2,422,001. Essentially, such binders are constructed and fabricated with an elongated lever that is pivotally mounted to a clevis, with the lever and clevis each having a fastening number, such as a hook for securement either directly to a load or to binding or tie down means such as a rope or a chain that is used for securement of a load. These devices are used extensively, particularly by the trucking industry and the like, for securement of loads which are being transported over long distances.

Various of the prior art load binders have had a swivel bolt secured either directly or indirectly to each of the lever and clevis. These swivel bolts have heretofore been formed as an integral piece with a shaft extending through corresponding openings in retaining members associated with the lever and the clevis, respectively. Once the shaft was inserted through the opening in the retaining member, the end of the shaft was peened to form a head on the swivel bolt to retain the swivel bolt in the retaining member. The swivel bolt heads formed in this manner have proved to be relatively weak and subject to breakage in use. Once the head breaks off one of the swivel bolts, the entire load binder separates at that point, with potentially disastrous results.

SUMMARY OF THE INVENTION

Among the various objects and features of the present invention may be noted with the provision of a load binder with an improved means for retaining swivel bolts.

Another object of the present invention is the provision of such a load binder with a swivel bolt having increased strength.

A third object of the present invention is the provision of an improved method of making load binders.

Other objects and features will be in part apparent and in part pointed out hereinafter.

Briefly, the present invention includes a load binder for use in securing a load held by ties such as a chain, cable or the like, which binder is of the type including a lever and a clevis. The lever and the clevis each have a securing member connected thereto for fastening on to the tie during load securement. A pivot mounts the lever for shifting with respect to the clevis in a first direction to a binding position and in an opposite direction to a second, loosened position. At least one of the securing members includes a swivel bolt having a shaft in an integrally formed head. A retaining member retains the swivel bolt against substantial axial movement when the load binder is in the binding position. The retaining member includes a collar defining a generally oval-shaped opening therethrough, the shaft of the swivel bolt extending through the oval-shaped opening, and the head of the swivel bolt being larger in at least one dimension than the corresponding portion of the oval-shaped opening so that the head engages the collar when the load binder is in the binding position.

The load binder as set forth above is made by preparing or casting the retaining member as a single piece having a collar defining an opening therein of suitable size and shape for passage of the head of the swivel bolt therethrough. The swivel bolt head is inserted through the opening in the collar, and then the collar is formed at an elevated temperature below the melting temperature of the material of which the collar is composed to reduce at least one dimension of the opening in the collar to a size small enough to retain the swivel bolt head in the collar while allowing the swivel bolt shaft to remain rotatable in the opening.

BRIEF DESCRIPTION OF THE DRAWINGS

FIG. 1 is a side elevation of a load binder of the present invention;

FIG. 2 is a top plan of the load binder of FIG. 1;

FIG. 3 is a cross-sectional view taken along lines 3—3 of FIG. 2 before final forming of the retaining members;

FIG. 4 is a cross-sectional view taken along lines 4—4 of FIG. 1 before final forming of the retaining member;

FIG. 5 is a view similar to FIG. 3 illustrating the final configuration of the retaining member; and FIG. 6 is a view similar to FIG. 4 showing the final configuration of the retaining member after forming.

Similar reference characters indicate similar parts throughout the drawing.

DESCRIPTION OF THE PREFERRED EMBODIMENT

A load binder 11 of the present invention (FIGS. 1 and 2) includes a conventional lever means 13 pivotally connected within a clevis means 15 by a pair of pivot pins 17. One end of lever means 13 is pivotally secured by a pivot pin 19 to a bar 21. The opposite end of bar 21 defines a collar 22 in which is secured a "eye" swivel bolt 23. A link 25 secures a hook or grabhook 27 to swivel bolt 23 to provide connection to a load or a tie member such as a rope or a chain.

Similarly, clevis means 15 defines a collar 29 in which is retained an "eye" swivel bolt 31. A link 33 secures a hook 35 to the swivel bolt. As can be seen in FIGS. 1 and 2, swivel bolts 23 and 31 include relatively flat heads 37 and 39, respectively, which secure the swivel bolts to their respective collars.

The load binder shown in FIGS. 1 and 2 is in its released or loosened position. It should be appreciated that since pivot pins 17 and 19 are offset from each other, upward movement of lever means 13 from the position shown in FIG. 1 results in the distance between hooks 27 and 35 being decreased, thereby binding the load.

As mentioned above, heads 37 and 39 in the prior art have tended to be a weak part of the structure because of their method of manufacture. Instead of the relatively flat head as shown in FIG. 1 of heads 37 and 39, prior art swivel bolt heads have tended to have a rounded head having a minimal thickness around the edge of the head where the force is actually applied when the load binder is in the binding position. The present invention overcomes this problem in the manner illustrated in FIGS. 3-6.

Swivel bolts 23 and 31 are formed as cast, integral pieces with heads 37 and 39 integrally formed thereon. Bar 21, including integrally formed collar 22, is also a single cast piece of a suitable material such as cast iron. It is cast with a generally circular opening 41 in the center thereof (FIG. 3). Opening 41 is of such a size and shape that head 37 of swivel bolt 23 fits easily therethrough. After casting, the swivel bolt is pushed through opening 41 in collar 22 so that the head 37 of swivel bolt 23 rests in the opening behind collar 22 while the shaft 43 of the swivel bolt is disposed in opening 41. At this time the casting is still at an elevated temperature suitable for forming the collar. Of course, bar 21 could be reheated to such a forming temperature if necessary. For cast iron such a temperature could be, for example, in the range from approximately 1300° F. to 2400° F. Collar 22 is then staked, that is, pressure is applied to opposite sides of collar 22 as indicated by the arrows in FIG. 5, to deform the heretofore circular collar to the oval-shaped shown in FIG. 5. More importantly, the central opening 41 is deformed from the generally circular shape shown in FIG. 3 to the generally oval-shape shown in FIG. 5 in which head 37 of the swivel bolt is captured by the collar.

In a similar fashion, collar 29 (FIG. 4) is formed as a integral cast part of clevis means 15. Preferably clevis means 15 is formed of a material such as cast iron. As cast, collar 29 defines the generally circular opening 45 therein of suitable size and shape to receive the head 39 of swivel bolt 31 while the shaft 47 of the swivel bolt is disposed in the opening. Upon removal from the mold, and while the casting is still at an elevated temperature as described above, the collar 29 is staked to assume the generally oval-shape shown in FIG. 6 with a generally oval central opening 45 which captures the head 39 of swivel bolt 31. Note that in both FIGS. 5 and 6, the central openings 41 and 45, respectively, are compressed only enough to capture the respective heads of the their pivot bolts without limiting the rotation of the shafts 43 and 47 of the pivot bolts in the respective openings. This method of manufacture therefore allows swivel bolts 23 and 31 to have a stronger head while still allowing the swivel bolts to swivel in their respective collars to accomodate the requirements of the specific loads being bound by the load binder.

Variations or modifications to the structure and method of this invention may occur to those skilled in the art upon reviewing the subject matter of this disclosure. Such variations or modifications, if within the spirit of this invention, are intended to be encompassed within the scope of any claims to patent protection issuing hereon. The description of the embodiments set forth herein is done so only for illustrative purposes.

What is claimed is:

1. A load binder for use in securing a load held by tie means such as a chain, cable, or the like, said binder being of the type including a lever means and a clevis means, each having a securing means connected thereto for fastening onto the tie means during load securement, pivot means for mounting said lever means for shifting with respect to the clevis means in a first direction to a binding position and in an opposite direction to a second, loosened position, said securing means being a swivel bolt and having a shaft and a head, means for retaining the swivel bolt against substantial axial movement when the load binder is in a binding position, said retaining means being made by the method comprising the steps of: casting a retaining member including a collar defining an opening therein of a suitable size and shape for passage of the head of the swivel bolt therethrough, the opening through the collar being originally substantially circular, and the swivel bolt head being substantially unworked, said swivel bolt being of a single, cast piece, inserting the swivel bolt head through the opening in the collar, and once the swivel bolt head is inserted through the opening, forming the collar at an elevated temperature, between about approximately 1300° F. to approximately 2400° F., below the melting temperature of the material of which the collar is cast, and reducing at least one dimension of the opening in the collar to a size small enough to retain the swivel bolt head in the collar while allowing the swivel bolt shaft to remain rotatable in the opening, wherein each collar defines after forming a generally oval-shaped and swivel bolt retaining opening.

2. In a load binder for use in securing a load held by tie means such as a chain, cable, or the like, said binder being of the type including a lever means and a clevis means, each having a securing means connected thereto for fastening onto the tie means during load securement, pivot means mounting said lever means for shifting with respect to the clevis means in a first direction to a binding position and in an opposite direction to a second, loosened position, the improvement which comprises at least one of said securing means including a swivel bolt having a shaft and an integrally formed head, and means for retaining the swivel bolt against substantial axial movement when the load binder is in a binding position, said retaining means including a collar defining a generally oval-shaped opening therethrough, the shaft of the swivel bolt extending through the oval-shaped opening and the head of the swivel bolt being larger in at least one dimension than the corresponding portion of the oval-shaped opening so that the head engages the collar when the load binder is in a binding position, said swivel bolt head being substantially unworked, said swivel bolt head having a substantially uniform thickness, said swivel bolt being formed of a single cast piece, said collar is formed of cast iron, the casting of the collar originally having a generally circular opening therein at the location of the oval-shaped opening of a size to permit the initial insertion of the swivel bolt head to pass therethrough during assembly, each securing means including a swivel bolt retained in said collar defining that generally oval-shaped opening.

3. The method of making a load binder for use in securing a load held by tie means such as a chain, cables, or the like, said binder being of the type including a lever means and a clevis means, each having a securing means connected thereto for fastening onto the tie means during load securement, pivot means mounting said lever means for shifting with respect to the clevis means in a first direction to a binding position and in an opposite direction to a second, loosened position, at least one of the securing means including a swivel bolt having a shaft and head and cast as a single piece, and means for retaining the swivel bolt against substantial axial movement when the load binder is in the binding position, said method comprising the steps of: preparing the retaining means as a single piece having a collar defining an opening therein of suitable size and shape for passage of the head of the swivel bolt therethrough, wherein the retaining means is cast as a single piece, and the opening in the cast piece is generally initially circular, inserting the swivel bolt head through the opening in the collar, once a swivel bolt head is inserted through the opening, forming the collar at an elevated temperature below the melting temperature of the material of which the collar is composed to reduce at least one dimension of the opening in the collar to a size to retain the swivel bolt head in the collar while allowing the swivel bolt shaft to remain rotatable in the opening, forming said single piece while still at an elevated termperature from the casting step, said collar being composed of cast iron and the forming step takes place at a temperature in the range of from approximately 1300° F. to approximately 2400° F., and mounting the respective securing means to the lever means or the clevis means.

* * * * *